April 22, 1941.  G. W. COCKS  2,239,484
DISPENSING STORAGE RECEPTACLE FOR BULK ICE CREAM DISTORTABLE CARTONS
Filed Feb. 20, 1940  4 Sheets-Sheet 2
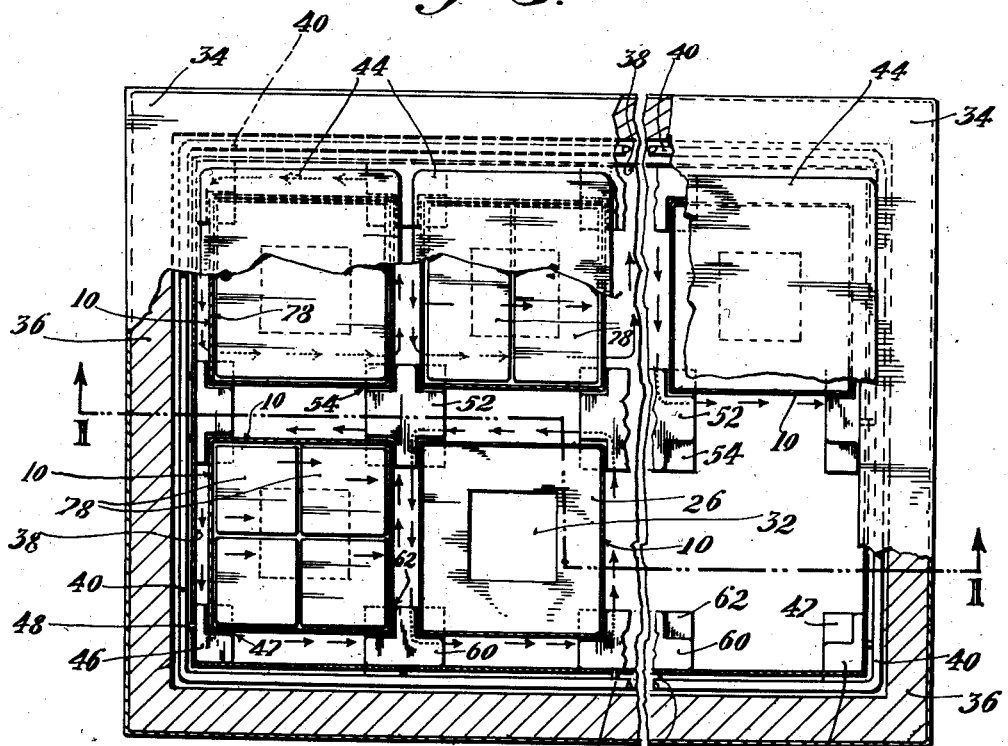
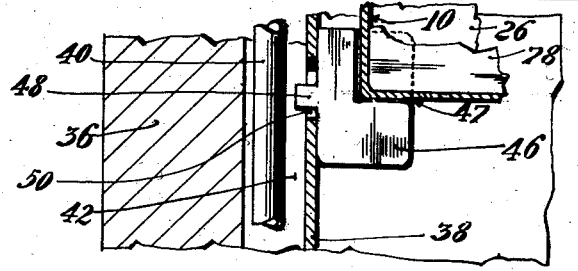
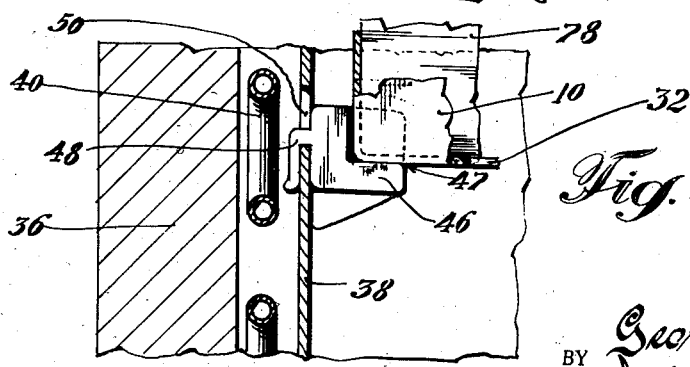
INVENTOR.
George W. Cocks
BY Irving F. Goodfriend
ATTORNEY.

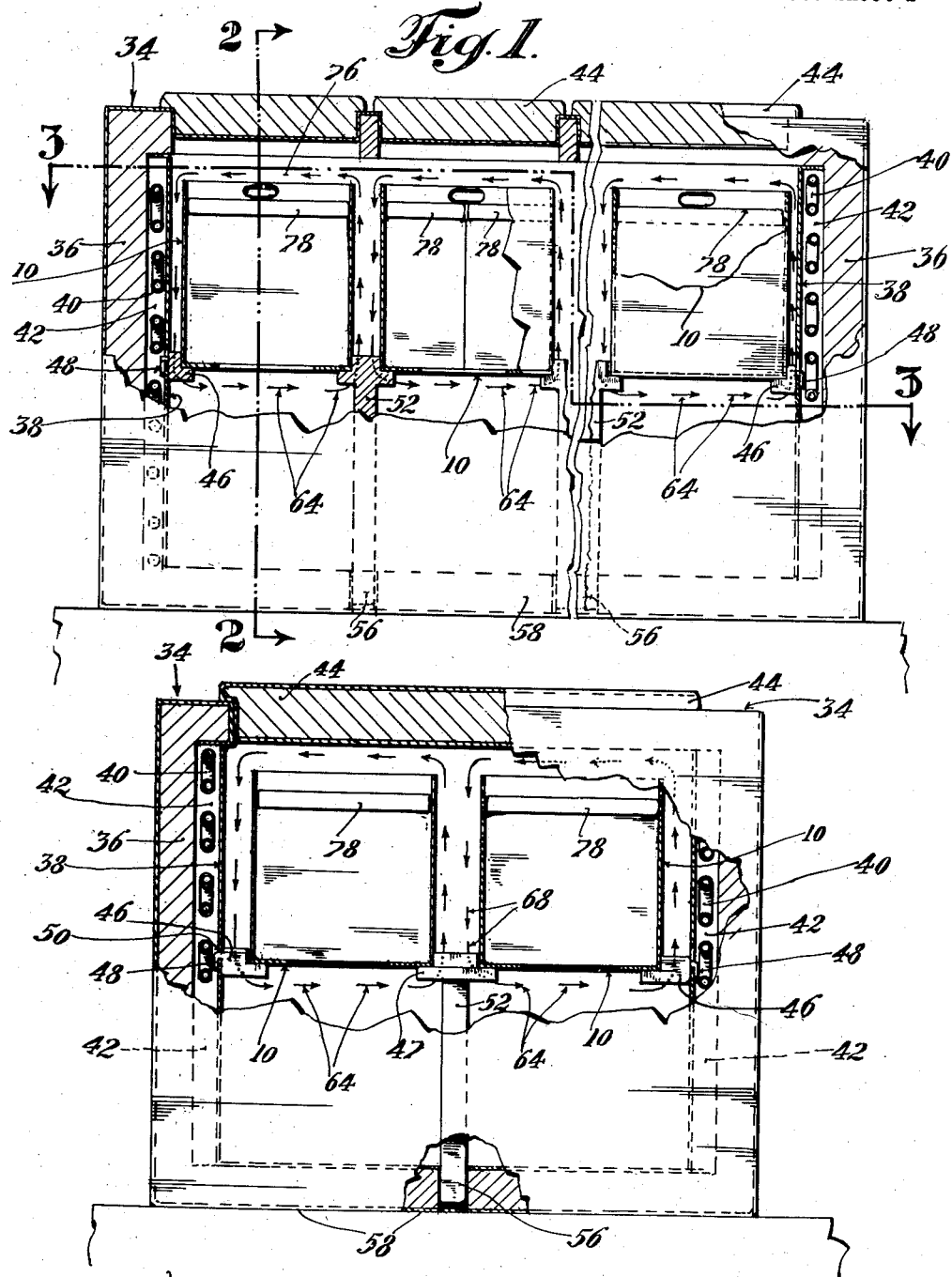

April 22, 1941.　　　　G. W. COCKS　　　　2,239,484
DISPENSING STORAGE RECEPTACLE FOR BULK ICE CREAM DISTORTABLE CARTONS
Filed Feb. 20, 1940　　　　4 Sheets-Sheet 3
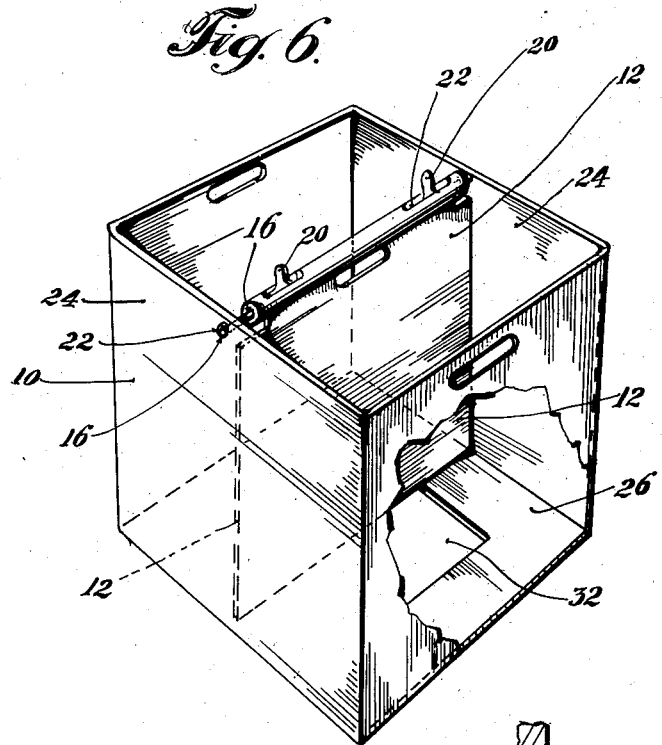
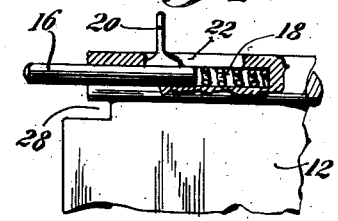
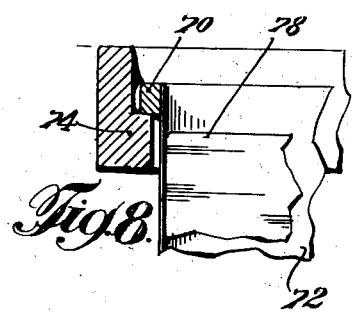
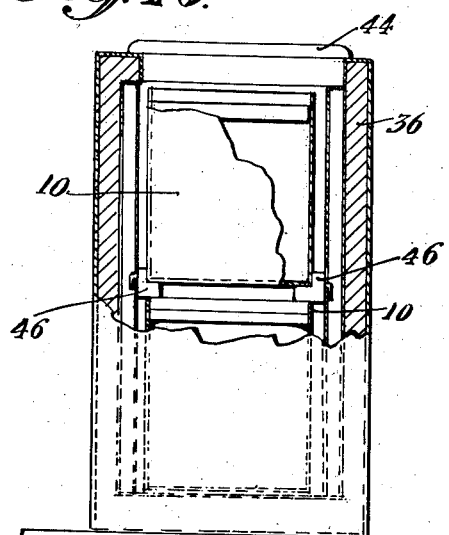
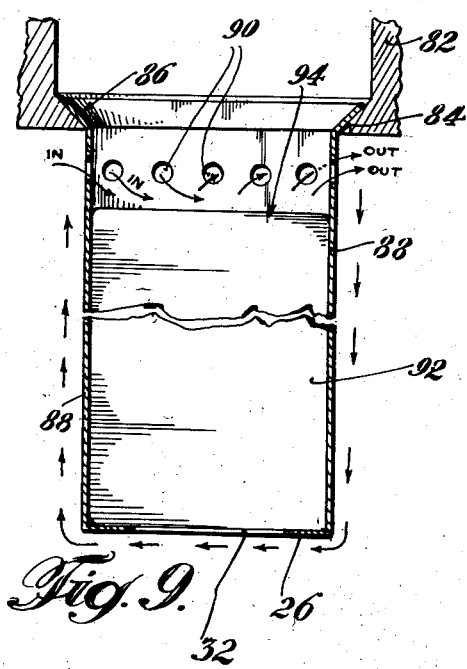
INVENTOR.
George W. Cocks
BY Irving F. Goodfriend
ATTORNEY.

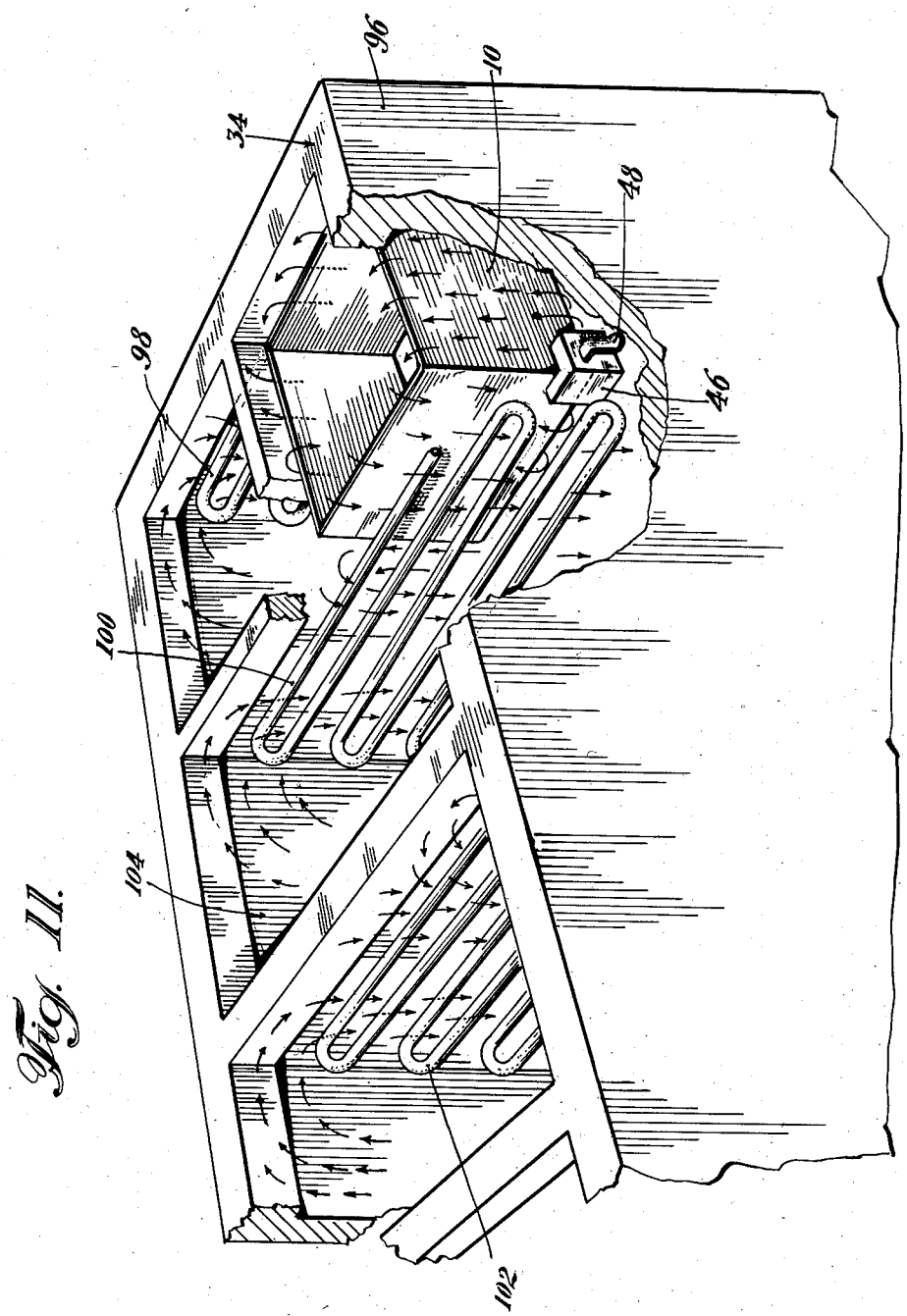

Patented Apr. 22, 1941

2,239,484

UNITED STATES PATENT OFFICE 2,239,484

DISPENSING STORAGE RECEPTACLE FOR BULK ICE CREAM DISTORTABLE CARTONS

George W. Cocks, Upper Montclair, N. J., assignor to Marathon Paper Mills Company, Rothschild, Wis., a corporation of Wisconsin Application February 20, 1940, Serial No. 319,824

14 Claims. (Cl. 62—114)

This invention relates to receptacles for distortable cartons in which ice cream or the like is packaged and which receptacles are to be arranged in refrigerated cabinets for dispensing therefrom the ice cream for individual servings. The invention further relates to a method of storing ice cream and the like, so packaged, in such receptacles in refrigerator cabinets.

I have described in Patent No. 2,109,102 issued to me February 22, 1938, a method for packaging bulk ice cream and similar freezable comestibles in cartons of comparatively large predetermined size and contour such that the ice cream and the like dispensing storage capacity of the conventional dispensing refrigerated cabinets is greatly increased over the present dispensing storage capacity of such cabinets.

In my co-pending application Serial No. 319,822 for patent for a Method of packaging in bulk frozen comestibles or the like, filed concurrently herewith, I have described an improvement to the method of my above-identified patent wherein cartons having a predetermined size and contour which are aliquants of a carton of larger selected or predetermined size and contour are used.

Such cartons are of abnormal size, having, for example, a capacity of one, two or four-gallons, this capacity being much greater than the usual pint and quart cartons hitherto used for individual servings of ice cream. The cartons contemplated by methods referred to hereinabove are made of comparatively thin cardboard stock so that they can be thrown away after being used. The cartons are preferably rectangular in shape, in contrast to the round metal containers heretofore used in packaging bulk ice cream, whereby there is obtained a great economy of storage space in the conventional refrigerated dispensing cabinets used in stores, soda fountains and similar places where ice cream is dispensed from bulk containers.

When these rectangular cartons, each having a capacity of one, two or four gallons, are employed, it is possible to place four one-gallon cartons or two two-gallon cartons or one four-gallon carton in the same space in the refrigerator cabinet occupied by the round bulk ice cream can at present generally used and which has a capacity of two and a half gallons. A great saving in space is obvious, for it is possible when using cartons packaged in accordance with my methods to increase the total product storage volume from at least forty per cent. to sixty per cent. depending upon the particular cabinet which is to be adapted for the storage of such cartons. Furthermore, it will be apparent that by having an ice cream of different flavor in each rectangular carton, the number of flavors of bulk ice cream which it is possible to dispense from a conventional cabinet is increased one hundred per cent. or more in the types of cabinet now at present in use.

In the method described in my said patent No. 2,109,102 and that described in my co-pending application Serial No. 319,822 for patent for a Method of packaging in bulk frozen comestibles or the like filed concurrently herewith, I employ cartons formed from relatively thin cardboard or hard surface paper which are linerless, non-rigid and, therefore, collapsible or distortable under ordinary stress. As described in said patent and co-pending application, such containers are of a predetermined size and contour or may be combined to form an assembly thereof which is of predetermined size and contour.

I have described in detail in my co-pending application Serial No. 319,822 for patent for Receiving and supporting receptacle for a bulk ice cream distortable carton filed concurrently herewith, a wire basket receptacle of particular construction which is specially adapted to be used in packaging bulk ice cream in such distortable cartons by these methods.

This application, therefore, concerns itself with the provision of a receptacle for receiving and storing such a distortable carton in which bulk ice cream is packaged so that the ice cream or comestible may be dispensed therefrom. The receptacles constructed in accordance with this invention have a predetermined size and contour which is complemental to that of the said wire basket receptacle and, therefore, the carton or cartons in which is packaged bulk ice cream in accordance with the foregoing methods of the patent or application.

The application, in addition, concerns itself with the adaption of a conventional refrigerated cabinet whereby ice cream so packaged in such distortable cartons may be satisfactorily dispensed therefrom or the provision of such a cabinet.

It will be understood that the ice cream which is to be dispensed from the refrigerator cabinet must be relatively soft, or at a dippable temperature. The packaged ice cream in the freezing room is, therefore, at a much lower temperature than the packaged ice cream in the refrigerator cabinet. As the temperature of the ice cream in the carton placed in the dispensing cabinet rises, the softening thereof will cause distortion of the walls of the carton, which, as pointed out, are not of sufficient inherent rigidity to withstand the accompanying pressure. Such distortion is accompanied with attendant possibility of rupture of the carton with resulting danger of contamination of the frozen ice cream or the like packaged therein. It is, therefore, necessary to provide a receptacle which will retain the same carton contour during the dispensing period. The receptacle of the herein concerned invention, therefore, snugly receives the ice cream carton and is provided with rigid walls which serve to retain the carton contour and support the walls thereof of the packaged ice cream or other frozen comestible stored in the dispensing cabinet.

In dispensing the ice cream from the carton for individual servings, it is scooped out therefrom by metal "dippers." With such metal "dippers," there is danger of tearing the carton walls, which are relatively extremely thin in the dispensing or scooping operation with attendant danger of contamination of the contents of the carton. The rigid side walls of the receptacle, therefore, in addition serve to prevent such puncture and tearing of the carton walls.

Further, the receptacle walls serve to prevent movement or displacement of the cartons in the receptacle during the dispensing operation.

My invention further contemplates the provision of such receptacles which are designed to receive paper cartons of predetermined contour, in which ice cream is packaged, and store them within a refrigerated cabinet for dispensing the ice cream therefrom.

My invention further contemplates the provision of such receptacles which are light in weight, formed of metal and which are adapted to be removably suspended or retained in the conventional dispensing refrigerator cabinet to adapt such cabinet for receiving bulk ice cream distortable cartons of the same predetermined size and contour as the receptacles and which cartons are packaged by the methods and the devices of my above identified patent and applications, whereby the walls of the cartons will be rigidly supported when the contents of the carton are scooped out or otherwise removed therefrom.

As hereinabove pointed out, the temperature of the ice cream or other comestible in the dispensing cabinet will rise over that of the ice cream in the freezing room causing the carton to distort and press against the refrigerator walls adjacent to it unless it was spaced away from them.

It will be further understood that the side walls of the cabinet, since they contain the refrigerating means, such as the coils, are comparatively cold and, therefore, precipitated moisture from the warmer air that enters the cabinet upon removal of the covers thereof will be deposited on the cabinet walls. It is, therefore, necessary to space the bulk ice cream cartons from the refrigerator side walls of the cabinet so that the wall surface of the carton will not adhere thereto. This is accomplished by providing a receptacle for the carton, the walls of which receptacle form no part of the cabinet walls but are spaced therefrom.

It will further be apparent that with such spacing of the receptacles from the cabinet walls there will be accompanied the necessary substantially uniform circulation of cold air about the walls of the receptacles and, therefore, the walls of the cartons, so that the temperature of the packaged product will not vary within the product. Such circulation of cooling air will prevent the formation of warm spots throughout the product packaged in any carton.

The invention further contemplates, therefore, the provision of a cabinet in which ice cream and the like packaged in cartons of bulk capacity is stored whereby continuous circulation of air about said cartons placed in the refrigerator cabinets for dispensing storage is obtained so that there is substantially no temperature differential throughout the refrigerator whereby the ice cream and the like is maintained in uniform dippable condition at all times at the top and the bottom of the cartons.

My invention still further contemplates the provision of an improved method of storing bulk ice cream and the like at dippable temperatures in a storage cabinet by which a constant and even temperature throughout the mass of the ice cream stored in the dispensing refrigerator cabinet is maintained.

Other and further uses and objects of the invention will be apparent from the following specification and the drawings in which Fig. 1 is an elevation of a refrigerator cabinet partly broken away to show the interior thereof in which are arranged receptacles for receiving cartons having ice cream or other frozen comestibles, and which is taken along the line 1—1 of Fig. 3.

Fig. 2 is a partial cross section taken along the line 2—2 of Fig. 1.

Fig. 3 is a sectional view taken along the line 3—3 of Fig. 1.

Fig. 4 is an enlarged fragmentary plan view of a receptacle support arranged in cabinet.

Fig. 5 is an enlarged fragmentary elevational view of the receptacle support shown in Fig. 4.

Fig. 6 is a perspective view of a receptacle showing a separator plate arranged therein.

Fig. 7 is an enlarged fragmentary view partly in section of the separator plate and locking means.

Fig. 8 is a fragmentary sectional view of a modified form of the receptacle.

Fig. 9 is a partial cross-sectional view of a modified form of receptacle and cabinet suspending means.

Fig. 10 is a partial sectional view of a refrigerator cabinet showing two superimposed receptacles.

Fig. 11 is a perspective view partially broken away illustrating a modified form of conventional refrigerator cabinet construction illustrating a receptacle arranged therein for storing bulk ice cream and the like in accordance with the invention.

Referring now to the drawings, the preferred construction of the receptacle 10 which is to be arranged in a conventional refrigerator is illustrated in Figure 5. The bottom and side walls of the receptacle are made of any suitable rigid light-weight material such as sheet metal, wood, Bakelite, or the like, and are secured together in any suitable well known manner, so as to form a rigid walled receptacle having the selected predetermined size and contour. The size and contour of the receptacle will be complemental to the carton of bulk ice cream which is packaged in accordance with the method of my Patent No. 2,109,102 or my co-pending application Serial No. 319,822 for patent for an improved Method of packaging in bulk frozen comestibles or the like filed concurrently herewith and the packaged cartons provided by the wire basket receptacles described in my co-pending application for patent for Receiving and supporting receptacle for a bulk ice cream distortable container, filed concurrently herewith. This receptacle 10 is preferably of a capacity to snugly retain and support therein a distortable container of four-gallon capacity.

In order to adapt the receptacle to receive cartons which are aliquot parts of the receptacle 10 capacity, a separator plate 12 may be arranged in the receptacle for dividing the interior thereof into two compartments, each compartment thereby being of such form, contour and size as to snugly receive a carton of ice cream which is an aliquot part of the receptacle, namely of two-gallon capacity. It will, of course, be understood that other separator plates, if desired, may be arranged in the receptacle 10 to cooperate with the plate 12 to thereby arrange the receptacle to receive four one-gallon cartons.

The separator plate 12 may be provided at its upper edge with a collar portion 14 having at each end a slidable locking bar 16 urged outwardly by a compression spring 18.

Lugs 20 to be grasped by the hand may be attached to the bar 16 for facilitating sliding of the locking bars against the spring from the openings 22 provided in the opposite side walls 24 and into which openings the bars fit for fixedly retaining the separator plate in position.

When it is desired to place two cartons of ice cream in the receptacle, the separator plate 12 may first be removed from the receptacle by grasping the portion of the collar 22 above the cutout portion 28 in the plate 12 as a handle. Two cartons of the proper predetermined size and contour are then placed within the receptacle, the separator plate being then inserted between the cartons and locked into place by the locking bars 16.

Each side wall 24 of the receptacle 10 preferably slightly tapers outwardly from the bottom wall 26 so that the compartment of the receptacle in which the ice cream carton is retained is somewhat smaller at the bottom thereof than it is at the top. This taper is preferably approximately one-eighth to one-sixteenth of an inch in a side wall length of nine inches, that is the dimensions of the open end 20 of the receptacle 10 are 1/8" to 1/4" greater than the dimensions of the bottom wall 26 in a receptacle that is 9" high. Such taper is illustrated by the dotted line 27 in Fig. 6.

It will be recognized that as the ice cream in the carton reaches a dippable dispensing temperature, it will soften and cause the carton to spread slightly and thereby conform to the side walls of the receptacle 10, thereby snugly retaining the carton in the receptacle to provide the desired support thereto to prevent rupture, puncture or collapse thereof.

The taper enables ready and easy insertion and removal of a carton into and from the receptacle 10. The bottom wall 26 of the receptacle 10 is provided with an opening 32 whereby the bottom of the carton is made accessible so that it may be pressed upwardly to remove it from the receptacle 10. This opening is preferably only of such size as to enable sufficient pressure to be placed on the carton to effect its removal while at the same time providing the flanges which are large enough to adequately support the bottom wall of the carton in the receptacle.

It will at once be recognized that I have provided a receptacle that makes it possible to dispense for individual servings therefrom ice cream or the like packaged in a light weight thin, tearable, puncturable and distortable carton, as of linerless paper. It will be apparent further that I have thereby provided means for supporting the thin paper walls of the carton, to facilitate dispensing of the ice cream or other frozen material therefrom without breaking or tearing or distorting the carton or distorting its contour during the dispensing operation. The receptacle 10 thus reenforces the walls of the carton when ice cream and the like is scooped out thereof.

Such construction provides a receptacle for packaged ice cream or other comestible produced by the novel methods and devices of my patent and applications referred to hereinabove.

The receptacles may be arranged in any conventional refrigerator cabinet which is of any suitable construction to make such cabinet available for use with the packaged ice cream distortable carton. It is preferred to removably position such receptacles 10 in a conventional cabinet such as illustrated in Figure 1. The cabinet 34 comprises outer walls 36 which are internally provided with conventional insulation 38. The refrigerator walls are provided with refrigerator coils 40 positioned within the inner walls 42 of the cabinet, the coils being held in place by any suitable means well known in the art. The refrigerator cabinet is closed with the conventional covers 44. The cabinet may be adapted to storage the packaged ice cream cartons concerned with here, by, for example, providing corner receptacle supports 46, recessed to provide ledges 47 and which supports have the bent tongues 48 of which may be arranged in cooperating slots 50 formed in the cabinet inner walls. Center posts 52 which are recessed to provide four ledges 54 may be removably arranged in cooperating slots 56 provided in the floor 58 of the cabinet. Side wall receptacle supports 60 are removably arranged in the cabinet and are suitably recessed to provide two ledges 62. The corner 46 and side wall 60 supports are arranged with respect to each other and the table-like centre supports 52 so that the respective ledges thereon cooperate to carry the receptacles in fixed position in the cabinet.

It will be apparent that the receptacles 10 may be removed from the supports when desired in order that a space provided therebeneath may become accessible for utilization for the purpose of storing therein any desired articles.

If desired, extra cartons of ice cream may be stored in this lower space in which case the corner, side wall, and centre supports may be removed so that the extra cartons may be passed into and stored in this lower space, as illustrated in Fig. 10.

As pointed out above, it is essential that the cartons of bulk ice cream and the like be stored for dispensing in the refrigerator cabinet in such manner that there will be an air circulation within the cabinet completely around the receptacles and the containers arranged therein in order that uniform temperature thereof can be obtained. In other words, the refrigerated air from the side walls of the cabinet should circulate therefrom in any direction and in all directions about the receptacles.

As heretofore pointed out, the present invention relates particularly to the storing of ice cream and other frozen comestibles in cartons which are substantially rectangular in contour and contain a bulk volume of not less than one gallon. When bulk quantities of ice cream and the like are packaged in such comparatively large cartons, the problem of maintaining the whole mass of the ice cream in the carton in dippable condition becomes a serious one when such cartons are stored in the conventional refrigerator cabinet. Where standard pint or quart rectangular cartons containing ice cream are stored in conventional refrigerators, the problem of maintaining the ice cream therein in proper consistency is not very serious because the differences in temperature induced by conduction and radiation do not make an appreciable difference in the texture of the ice cream, inasmuch as the mass of ice cream contained in such small cartons is not very great. However, when such large masses of bulk ice cream, such as of one or more gallons, are stored in square carons in a refrigerator, it is essential that a constant and even temperature of such ice cream be maintained throughout its entire mass in order to have the ice cream at dippable temperature and also in order to maintain the desirable quality, texture and flavor of the ice cream.

Conventional types of refrigerating surfaces usually found in soda fountain cabinets and the like generally fall into three different types. First, there are cabinets which contain circular openings adapted for receiving two five-gallon containers which extend about two-thirds of the way down from the top of the opening. The second type of refrigerator cabinet contains plates or coils running crosswise of the cabinet forming compartments within the cabinet. The third type of cabinet is constructed so that all the walls of the cabinet are refrigerated by suitable coils within the walls. In all these three types of refrigerator cabinets, heat enters through the insulation at the bottom, side walls or top, thence into the air within the cabinet, or directly into the mass of ice cream if the ice cream carton is in direct contact with the wall. Such heat is transferred to the ice cream either by radiation, conduction or convection. I have found that radiation or conduction cannot be relied upon for maintaining uniform temperatures in bulk masses of ice cream and the ice cream will, therefore, not have a suitable dippable consistency.

In order to overcome these difficulties, I have discovered that a uniform dippable temperature can be maintained throughout the entire mass of the ice cream if a rectangular carton containing the ice cream is supported in a refrigerator cabinet in such manner as to permit setting up of a directed air circulation about the carton. The carton is placed in such manner in the refrigerator cabinet as to direct the air circulation so that the infiltrated heat can circulate as directly as possible to the refrigerated surfaces of the cabinet without going through the mass of the ice cream itself.

This is accomplished by positioning the receptacles 10 within the cabinet, as illustrated in Figure 1, that they are as heretofore pointed out spaced from the walls of the cabinet, as well as from each other so that air will circulate about all the sides of the receptacle holding the ice cream carton as indicated by the arrows. In addition, the receptacle 10 is positioned in the cabinet so that the cover or top 76 of the carton 78 is somewhat below the upper extremity 80 of the refrigerated surfaces of the inner walls of the cabinet so that the air will circulate as well around the top of the carton. Fig. 1 illustrates the path of the air circulating from the top to the bottom of the cabinet around the receptacle as indicated by the arrows 64 and 66.

The path of the air around the other sides of the receptacles is indicated by the arrow 68 illustrated in Fig. 2. Circulation is set up about each of the receptacles containing the cartons as shown in Fig. 3.

It will be thus seen that the insert receptacles are spaced away from the inner walls of the cabinet and at no point are they in contact either with the walls or refrigerated surfaces of the cabinet, but are spaced away so as to permit definite air circulation between the receptacle and the wall of the cabinet. Circulation of air about all four sides of the receptacle is thereby assured by the manner of suspending the receptacle in the cabinet and any infiltrated heat within the cabinet is carried by the air current to the refrigerated walls of the cabinet. The entire mass of bulk ice cream and the like contained in the carton is, therefore, maintained at a constant uniform temperature at all times whereby the texture of the ice cream is such that it is in a dippable condition for dispensing purposes.

In accordance with the present invention, therefore, a method is provided for maintaining and storing ice cream in bulk quantities while contained in substantially rectangular cartons of bulk size of one or more gallon capacity whereby the ice cream and the like may be constantly maintained in dippable texture and condition for dispensing purposes.

A modified form of receptacle is illustrated in Figure 8. A collar 70 is united to the upper wall portion of the receptacle 72 so as to permit it to be suspended on a supporting bracket 74 provided in the refrigerator cabinet. Other suitable means for suspending the receptacles in a cabinet may be provided, such as those illustrated in Fig. 9. The upper portion of the cabinet is provided with members 92 joined with the body of the cabinet and having integral suspending brackets 84 extending into the cabinet and which are provided with a beveled surface complemental to the beveled surface of the collar 86 formed on the receptacle 88. The suspending brackets are thus adapted to support the receptacles in the cabinet by means of the beveled collar portion. The beveled collar also serves to seal the air within the cabinet and minimizes the formation of frost on the walls of the cabinet by preventing ingress of air thereto.

The receptacle 88 is provided around the upper portion of the walls thereof with suitable apertures 90 so that the circulation of air around the carton 92 past the top 94 thereof will not be inhibited. It is to be noted that the receptacle is of such size that the upper end of the carton is disposed below such apertures and below the ends of the upper extremity of the refrigerated walls.

It is to be understood that the invention is not restricted to any specific cabinet construction such as that illustrated in Figs. 1, 2 and 3, but that any other suitable construction may be utilized for storing the packaged ice cream in such manner as to permit a directed air circulation within the refrigerator cabinet. A modification, for example, is illustrated in Fig. 11 wherein a cabinet 96 is provided having refrigerating coils 98, 100 and 102 extending crosswise of the cabinet but which do not go completely around the walls thereof as in the modification illustrated in Figs. 1, 2 and 3. The cold air drops down along the refrigerating coils and moves up along the front and rear walls of the refrigerator cabinet as indicated by the arrows 104.

It is to be understood that the modifications above described may be changed in any of their details within the spirit and scope of the invention and that I do not intend to limit myself thereto, but intend the invention to be construed as broadly as the scope of the art and the appended claims permit.

I claim:

1. A receptacle for receiving and supporting therein, within a dispensing refrigerator cabinet, a linerless carton which does not have sufficient rigidity to be self-supporting, said carton having a selected size and predetermined contour and packaged in bulk with a frozen comestible, which comestible is to be dispensed in individual servings from the said carton within the refrigerator, comprising side and bottom walls forming a compartment of complemental size and contour of a said carton to snugly receive it, the side and bottom walls fitting closely against the adjacent walls of the carton received in the receptacle to prevent any movement of the carton relative to the walls of the receptacle upon dispensing the comestible from the carton.

2. A receptacle for receiving and supporting therein a carton which does not have sufficient inherent rigidity to be self-supporting, said carton having a selected size and predetermined contour and being bulk filled with a hardened or congealed comestible, said receptacle adapted to be arranged within a dispensing refrigerator cabinet for dispensing the comestible from the said carton in individual servings, said receptacle comprising opposed spaced side walls extending upwardly from a bottom wall to form a compartment for receiving a said carton, said compartment of size and contour complemental to that of a said carton to snugly receive it therein, the side and bottom walls fitting closely against adjacent walls of the carton received in the receptable to prevent movement of the carton relative to the compartment when the comestible is dispensed from the carton.

3. The receptacle of claim 2, the bottom wall thereof having an opening therein.

4. The receptacle of claim 2, the bottom wall thereof having an opening therein, said opening of such size to form flanges large enough to adequately support the said carton.

5. The receptacle of claim 2, said side walls extending upwardly and slightly outwardly from the bottom wall.

6. The receptacle of claim 2, the bottom wall thereof having an opening therein, said side walls extending upwardly and outwardly from the bottom wall.

7. In combination, a refrigerated dispensing storage cabinet, a receptacle for receiving and supporting therein a distortable carton of selected size and predetermined contour and bulk filled with a hardened or congealed cosmestible of consistency to be scooped from out of the carton in individual servings, said receptacle comprising opposed spaced side walls extending upwardly from a bottom wall to form a compartment of size and contour complemental to that of the said carton and thereby adapted to snugly receive it therein, and means in the cabinet for arranging the receptacle therewithin in position to enable the comestible to be dispensed from the carton, the said side walls and bottom wall fitting against the adjacent walls of the carton received in the receptacle.

8. A receptacle for receiving and supporting therein, within a refrigerated dispensing storage cabinet, a distortable carton of selected size and predetermined contour and bulk filled with a hardened comestible of consistency to be scooped from out of the carton in individual servings, said receptacle comprising opposed side walls extending upwardly from a bottom wall to form a compartment of size and contour complemental to that of said carton to snugly receive said carton therein and a separator plate extending between said side walls and forming adjacent compartments having a unit contour and size which are aliquot parts of the first mentioned compartment.

9. A receptacle for receiving and supporting therein, within a refrigerated dispensing storage cabinet, a distortable carton of selected size and predetermined contour and bulk filled with a hardened or congealed comestible of consistency to be scooped from out of the carton in individual servings, said receptacle comprising opposed side walls extending upwardly from a bottom wall to form a compartment of size and contour complemental to that of said carton to snugly receive said carton therein and means arranged in said receptacle to form therein adjacent compartments having a unit size and contour which are aliquot parts of the first mentioned compartment.

10. In a dispensing cabinet for storing therein cartons filled in bulk with a relatively large mass of a frozen comestible and which comestible is to be maintained in the cabinet at a temperature at which the frozen comestible is of suitable consistency to be scooped from out the carton in individual servings, said cabinet having a floor, closed top and upstanding walls and refrigerating means in the walls, a receptacle for receiving and supporting a said carton therein and means for suspending said receptacle in the cabinet in spaced relation to the floor, top and walls of the cabinet, said receptacle, having a carton received therein, cooperating with the floor, top and walls of the cabinet to form a circulating air path about a carton received in the receptacle.

11. In a dispensing cabinet for storing therein cartons filled in bulk with a relatively large mass of a frozen comestible and which comestible is to be maintained in the cabinet at a temperature at which the frozen comestible is of suitable consistency to be scooped from out the carton in individual servings, said cabinet having a floor, closed top and upstanding walls and refrigerating means in the walls, a receptacle for receiving and supporting a said carton therein and means for suspending said receptacle in the cabinet in spaced relation to the floor, top and walls of the cabinet, and positioning a carton received in the receptacle below the upper extremity and above the lower extremity of the refrigerating means in walls, said receptacle having a carton received therein cooperating with the floor, top and walls of the cabinet to form a circulating air path about a carton received in the receptacle.

12. In a dispensing cabinet for storing therein cartons filled in bulk with a relatively large mass of a frozen comestible and which comestible is to be maintained in the cabinet at a temperature at which the frozen comestible is of suitable consistency to be scooped from out the carton in individual servings, said cabinet having a floor, closed top and upstanding walls and refrigerating means in the walls, a plurality of receptacles, each for receiving and supporting therein a said carton and means for suspending said receptacles in the cabinet each spaced away from the floor, top and walls of the cabinet and each receptacle spaced away from any adjacent receptacle, said receptacles cooperating with the floor, top and walls of the cabinet and the walls of adjacent receptacles to form a circulating air path about a carton received in the receptacles.

13. The dispensing cabinet of claim 12, a carton received in the receptacles being positioned below the upper extremity and above the lower extremity of the refrigerating means in the walls.

14. A receptacle, for receiving and supporting therein a carton which does not have sufficient inherent rigidity to be self-supporting, said carton having a selected size and predetermined contour and being bulk filled with a hardened or congealed comestible, said receptacle adapted to be removably arranged within a dispensing refrigerator cabinet for dispensing the comestible from the said carton in individual servings, said receptacle comprising opposed spaced side walls extending upwardly from a bottom wall to form a compartment for receiving a said carton, said compartment of size and contour complemental to that of a said carton to snugly receive it therein, the side and bottom walls fitting closely against adjacent walls of the carton received in the receptacle to prevent movement of the carton relative to the compartment when the comestible is dispensed from the carton.

GEORGE W. COCKS.